(12) United States Patent
Barakat et al.

(10) Patent No.: US 11,704,729 B1
(45) Date of Patent: *Jul. 18, 2023

(54) BREAK THE GLASS FOR FINANCIAL ACCESS

(71) Applicant: Wells Fargo Bank, N.A., San Francisco, CA (US)

(72) Inventors: Wayne Barakat, Novato, CA (US); Maria M. Benjamin, Oakland, CA (US); Ha M. Duong, San Francisco, CA (US); Laura Marie Fontana, San Francisco, CA (US); Brian Hanafee, Pleasanton, CA (US); Marion M. Hsieh, San Francisco, CA (US); Caroline Machado, Mountain View, CA (US); Walter Schenk, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/338,154

(22) Filed: Jun. 3, 2021

Related U.S. Application Data

(63) Continuation of application No. 15/390,004, filed on Dec. 23, 2016, now Pat. No. 11,037,231.

(51) Int. Cl.
*G06Q 40/02* (2023.01)
*G06F 21/45* (2013.01)
*G06Q 50/18* (2012.01)

(52) U.S. Cl.
CPC ............. *G06Q 40/02* (2013.01); *G06F 21/45* (2013.01); *G06Q 50/186* (2013.01); *G06F 2221/2141* (2013.01)

(58) Field of Classification Search
CPC ...... G06Q 40/02; G06Q 50/186; G06F 21/45; G06F 2221/2141
See application file for complete search history.

(56) References Cited

U.S. PATENT DOCUMENTS 8,495,158 B2 7/2013 Chung
8,558,660 B2 10/2013 Nix et al.
(Continued)

FOREIGN PATENT DOCUMENTS

GB 2545738 A * 6/2017 ............. G06F 21/32
WO WO-2012/118585 9/2012
(Continued)

OTHER PUBLICATIONS

Y. M. Huang, M. Y. Hsieh, H. C. Chao, S. H. Hung and J. H. Park, "Pervasive, secure access to a hierarchical sensor-based healthcare monitoring architecture in wireless heterogeneous networks," in IEEE Journal on Selected Areas in Communications, vol. 27, No. 4, pp. 400-411, May 2009. (Year: 2009).*
(Continued)

*Primary Examiner* — Virpi H Kanervo
(74) *Attorney, Agent, or Firm* — Foley & Lardner LLP

(57) ABSTRACT

Systems, methods, and computer-readable storage media utilized for determining access to a financial account held by a customer of a financial institution. One method includes establishing a communication session with a sensor device, wherein the financial institution computing system continuously receives sensor data over the communication session and receiving, from a point-of-sale (POS) terminal, a payment request. The method further includes retrieving, from the user device via an application programming interface (API), device data including at least application data and receiving, from the sensor device, the sensor data including at least one of geolocation data or biometric data of the sensor device. The method further includes determining the
(Continued)

customer experienced an adverse event based on the sensor data and the device data and determining automatically an access level. The method further includes authorizing, by the processor, the payment request utilizing the financial account held by the customer to a designee.

20 Claims, 8 Drawing Sheets

(56) References Cited

U.S. PATENT DOCUMENTS

| | | | |
|---|---|---|---|
| 8,744,397 B2 | 6/2014 | Gee et al. | |
| 8,754,766 B2 | 6/2014 | Oesterling et al. | |
| 8,868,028 B1 | 10/2014 | Kaltsukis | |
| 10,387,980 B1* | 8/2019 | Shahidzadeh | H04L 63/0861 |
| 10,587,658 B2 | 3/2020 | Dowlatkhah et al. | |
| 10,860,621 B1 | 12/2020 | Ross et al. | |
| 2002/0019744 A1 | 2/2002 | Yamamoto | |
| 2011/0245633 A1* | 10/2011 | Goldberg | A61B 5/165 |
| | | | 600/323 |
| 2012/0047055 A1 | 2/2012 | Aiello | |
| 2013/0017791 A1 | 1/2013 | Wang et al. | |
| 2013/0133055 A1 | 5/2013 | Ali et al. | |
| 2013/0204645 A1 | 8/2013 | Lehman et al. | |
| 2013/0226369 A1 | 8/2013 | Yorio et al. | |
| 2015/0084757 A1 | 3/2015 | Annibale et al. | |
| 2015/0112883 A1 | 4/2015 | Orduna et al. | |
| 2015/0228039 A1 | 8/2015 | Mahgoub et al. | |
| 2017/0035367 A1* | 2/2017 | Reich | A61B 5/1112 |
| 2017/0133051 A1 | 5/2017 | Mack et al. | |

FOREIGN PATENT DOCUMENTS

| | | | |
|---|---|---|---|
| WO | WO-2013/181350 A2 | 12/2013 | |
| WO | WO-2016/088087 A1 | 6/2016 | |
| WO | WO-2020203744 A1 * | 10/2020 | G06F 21/32 |

OTHER PUBLICATIONS

FINRA POA—April 1016.
FINRA Power of Attorney (Year 2016).
Lamm, James D., Kunz, Christina L., Riehl, Damien A., Rademacher, Peter John. The Digital Death Conundrum: How Federal and State Laws Prevent Fiduciaries from Managing Digital Property. 68 U. Miami L. Rev. 385, pp. 385-420 (2013-2014). (Year: 2014).
What Happens If You Become Incapacitated?—Dec. 2015.

* cited by examiner

| Types of Adverse Event | Designees | Access Levels | Access Duration | Additional Authentication |
|---|---|---|---|---|
| Incapacitation with high likelihood of recovery | Agent A | For medical expenses only | Before recovery | Passcode |
| Incapacitation with low likelihood of recovery | Family Member A | Emergency Fund only | 3 months | Biometric authentication |
| Deceased | Trustee | Saving Accounts | Perpetual | None |

Determining adverse event that causes death or incapacitation to customer based on adverse event message received from user device associated with customer — 510

↓

In response to determining adverse event, granting access to financial account held by customer to designee — 520

FIG. 5

BREAK THE GLASS FOR FINANCIAL ACCESS

CROSS-REFERENCE TO RELATED APPLICATIONS AND CLAIM OF PRIORITY

This application is a continuation of and claims priority to U.S. patent application Ser. No. 15/390,004, entitled "Break The Glass For Financial Access," filed Dec. 23, 2016, of which is incorporated herein by reference in its entirety and for all purposes.

BACKGROUND

When an account holder of a financial account becomes incapacitated or deceased, responses from a financial institution with which the financial account is held can be rather slow. For instance, verification procedures for ascertaining the account holder's current condition can be extensive and time-consuming. Financial resources for treating the account holder may not become available until the verification procedures are executed, resulting in failure to timely apply the financial resources in the most appropriate manner. Sometimes, life-saving procedures may not be timely performed due to a lack of financial resources. This can be especially troublesome when the account holder is the main source of income for a household.

SUMMARY

Examples described herein relate to apparatus and methods for granting access of a financial account held by an account holder (e.g., a customer) to a designee in response to incapacitation or death of the account holder. For instance, a financial institution computing system receives an adverse event message indicative of the customer's incapacitation or death from a user device associated with the customer. The user device includes any device that is portable, wearable, implantable, or otherwise associated with the account holder that can determine information (e.g., biometric information) relevant to physical well-being of the customer. In response to receiving the adverse event message from the user device, the financial institution computing system automatically triggers "breaking the glass" operation that grants a designee complete or partial access to the financial account held by the account holder.

In some arrangements, a method for determining access to a financial account held by a customer of a financial institution includes determining, by a processor of a financial institution computing system, an adverse event that causes death or incapacitation to the customer based on an adverse event message received from a user device associated with the customer, and in response to determining the adverse event, granting, by the processor, the access to the financial account held by the customer to a designee.

In some arrangements, the method further includes receiving the adverse event message from the user device, wherein the adverse event message indicates that the adverse event has occurred.

In some arrangements, the adverse event message includes biometric data associated with the customer, and the adverse event is determined by the processor based on the biometric data.

In some arrangements, the method further includes receiving, from the user device, information regarding one or more of at least one type of adverse event to trigger the access, at least one potential designee includes the designee, levels or nature of the access, time or duration of the access, or additional authentication for the designee.

In some arrangements, the information includes correspondence among the one or more of the at least one type of adverse event to trigger the access, the at least one potential designee includes the designee, the levels or nature of the access, the time or duration of the access, or the additional authentication for the designee from the user device.

In some arrangements, the access is granted based on the one or more of the at least one type of adverse event to trigger the access, the at least one potential designee includes the designee, the levels or nature of the access, the time or duration of the access, or the additional authentication for the designee from the user device.

In some arrangements, the method further includes determining a type of adverse event associated with the adverse event based on the adverse event message.

In some arrangements, the method further includes determining one or more of the designee, the level or nature of the access, the time or duration of the access, or the additional authentication based on the type of adverse event.

In some arrangements, the method further includes verifying acceptance of the designee to access the financial account by sending a verification message to a designee device associated with the designee, and receiving a response from the designee device.

In some arrangements, granting the access to the financial account held by the customer to the designee includes sending credentials associated with the financial account to a designee device associated with the designee.

In some arrangements, the method further includes sending an alert message to the user device associated with the customer notifying the customer that the access has been granted.

In some arrangements, the method further includes receiving a response from the user device indicating that the access is to be withdrawn, and in response to receiving the response, withdraw the access granted.

In some arrangements, granting the access to the financial account includes initiating a timer in response to determining the adverse event, and sending an alert message to the user device associated with the customer notifying the customer that the access will be granted.

In some arrangements, the method further includes determining that a response from the user device has not been received before expiration of the timer, and granting the access to the financial account in response to determining that the response has not been received before the expiration of the timer.

In some arrangements, granting the access to the financial account to the designee includes authenticating the designee based on a set of credentials associated with the designee.

In some arrangements, a financial institution computing system includes a network interface structured to facilitate data communication via a network, a memory, and a processing circuit includes a processor, the processing circuit configured to determine an adverse event that causes death or incapacitation to the customer based on an adverse event message received from a user device associated with the customer, and in response to determining the adverse event, granting the access to the financial account held by the customer to a designee.

In some arrangements, a non-transitory processor-readable medium having processor-readable instructions stored thereon, such that when executed by a processor of a financial institution computing system, the processor is configured to determine an adverse event that causes death or incapacitation to the customer based on an adverse event message received from a user device associated with the customer, and in response to determining the adverse event, granting the access to the financial account held by the customer to a designee In some arrangements, the processor is further configured to receive the adverse event message from the user device, wherein the adverse event message indicates that the adverse event has occurred.

In some arrangements, the adverse event message includes biometric data associated with the customer, and the adverse event is determined based on the biometric data.

In some arrangements, the processor is further configured to receive, from the user device, information regarding one or more of at least one type of adverse event to trigger the access, at least one potential designee includes the designee, levels or nature of the access, time or duration of the access, or additional authentication for the designee.

These and other features, together with the organization and manner of operation thereof, will become apparent from the following detailed description when taken in conjunction with the accompanying drawings.

BRIEF DESCRIPTION OF THE FIGURES

FIG. 4 is a table illustrating correspondence between types of adverse event with various designees, access levels, access durations, and additional authentications in some arrangements.

FIG. 5 is a flow diagram illustrating a method for determining access to a financial account held by a customer of a financial institution according to various arrangements.

DETAILED DESCRIPTION

Referring generally to the FIGS., examples presented herein are related to a financial institution "breaking the glass" with respect to a financial account held by a customer (e.g., an account holder) of the financial institution in response to detecting that the customer is incapacitated or deceased. A financial institution computing system receives an adverse event message from a user device. The user device is capable of determining various parameters relevant to the health or physical well-being of the customer. The user device includes one or more of a mobile communication device (e.g., a smart phone, tablet, or the like), wearable device (e.g., a smart watch, smart glasses, digital wristband, or the like), implantable device (e.g., a pacemaker, neurological implant, cardiovascular implant, patch pump, or another implanted biometric sensor), a sensor in a vehicle (e.g., an accelerometer, impact sensor, or the like in a car driven by the customer), a fixed sensor (e.g., a camera in a home or office of the customer), or the like. In response to receiving the adverse event message via a network, the financial institution computing system grants access of the financial account to a designee to manage the financial account.

Figure 1:
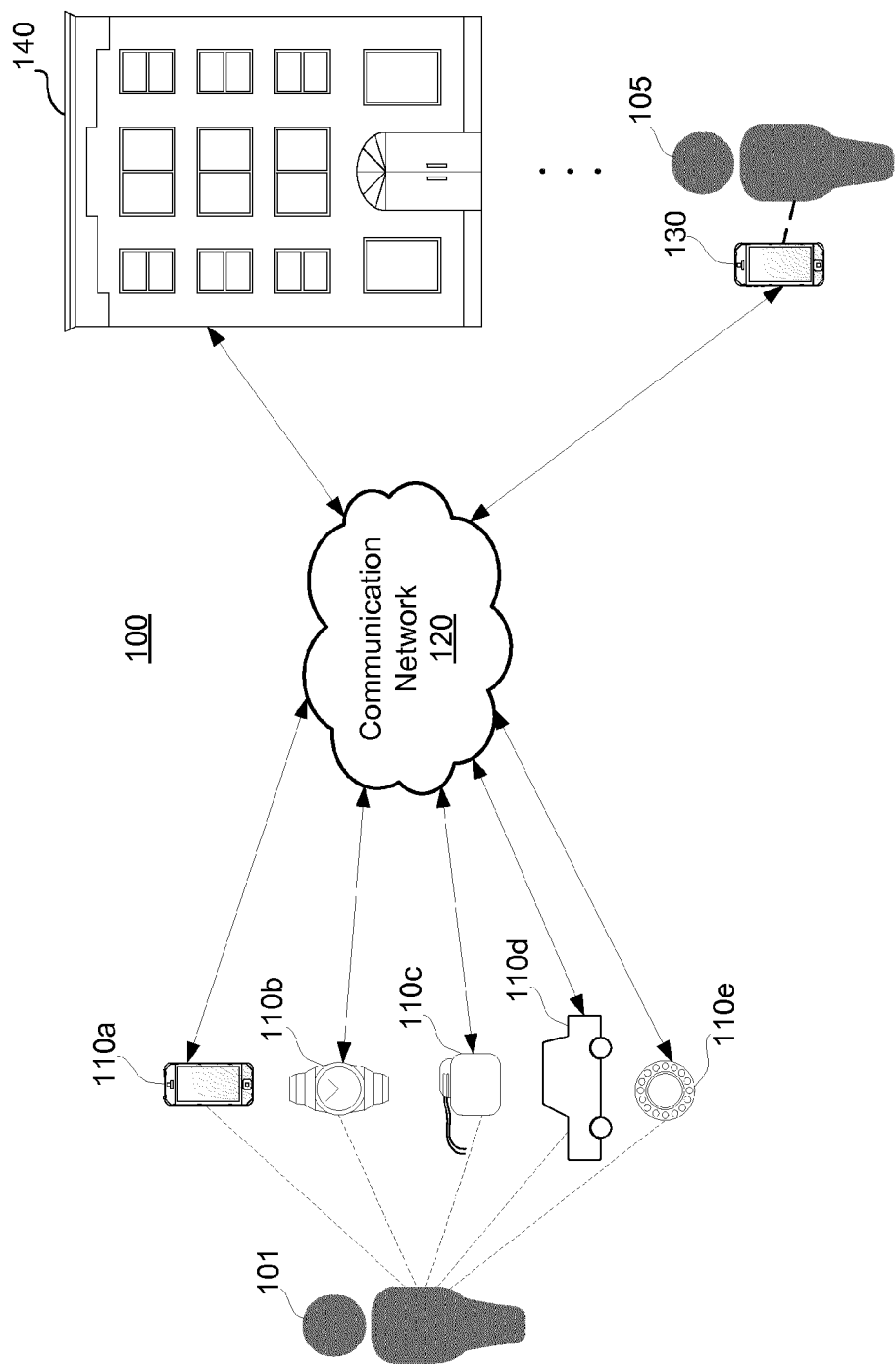
FIG. 1 is a diagram of an example of a system for determining access to a financial account held by a customer of a financial institution according to some arrangements.

FIG. 1 is a diagram of an example of a system 100 for determining access to a financial account held by a customer 101 of a financial institution 140 according to some arrangements. Referring to FIG. 1, the customer 101 is an account holder of at least one financial account at the financial institution 140. The customer 101 is an individual who experiences an adverse event resulting in incapacitation or death. The customer 101 is associated with one or more user devices 110a-110e. Each of the user devices 110a-110e can detect at least one parameter relevant to the health of the customer 101. One or more of the user devices 110a-110e are associated with (e.g., carried by, worn by, implanted in, or operated by) the customer 101 in some arrangements. In other arrangements, one or more of the user devices 110a-110e are associated with another person or entity other than the customer 101, but the user devices 110a-110e can nevertheless detect parameters relative to the physical well-being of the customer 101. One or more components in the user devices 110a-110e are Internet-of-Things (IoT) devices.

In some scenarios, the customer 101 carries a mobile communication device 110a (e.g., a smart phone, tablet, or the like). In some examples, the mobile communication device 110a includes an accelerometer that can detect physical adverse events such as falling, slipping, being impacted by a fast-moving object in a scenario such as vehicle accident, or the like. The accelerometer can detect such events due to sudden (and sometimes unnatural or unexpected) acceleration/deceleration of the mobile communication device 110a, given that the customer 101 is assumed to be carrying the mobile communication device 110a in some configurations. The mobile communication device 110a includes a geolocation device that determines a location of the mobile communication device 110a, and by inference, the location of the customer 101. An adverse event such as incapacitation can be detected when the geolocation device indicates that the mobile communication device 110a (and the customer 101) is in a location of interest (e.g., a hospital, highway, battlefield, or the like) for duration of time exceeding a threshold. In some configurations, the mobile communication device 110a is coupled to another user device 110a-110e (or user device 210 of FIG. 2) via a suitable connection (e.g., Bluetooth, Wi-Fi, cellular data, or the like) to relay the adverse event message detected from the other user devices 110a-110e (or the user device 210 of FIG. 2) to the financial institution 140 (e.g., the financial institution computing system 242 of FIG. 2).

In some scenarios, the customer 101 wears a wearable device 110b. Examples of the wearable device 110b include, but not limited to, a smart watch (e.g., Apple Watch®), smart glasses (e.g., Google Glass™), digital wristband or bracelet (e.g., FitBit®), or other sensor-embedded clothing, shoes, buttons, belts, hat-wear, or the like). By virtue of being worn by the customer 101, the wearable device 110b includes one or more biometric sensors that can determine biometric parameters (e.g., heartrate, blood pressure, blood oxygen level, temperature, brain activities, or the like) associated with the customer 101. The adverse event message can be determined based on the biometric parameters.

In some scenarios, the customer 101 has an implantable device 110c that is at least partially implanted or otherwise inserted into the body of the customer 101. Examples of the implantable device 110c include, but not limited to, a pacemaker, neurological implant, cardiovascular implant, patch pump, catheter, or another implantable biometric sensor. The implantable device 110c can likewise measure biometric parameters (e.g., heartrate, blood pressure, blood oxygen level, temperature, brain activities, or the like) associated with the customer 101. The adverse event message can be determined based on the biometric parameters.

In some scenarios, the customer 101 operates or is transported by a vehicle 110d. Examples of the vehicle 110d includes, but not limited to, a car, truck, plane, tank, ship, or the like. The vehicle 110d includes various sensors such as, but not limited to, an accelerometer, impact detector, fire detector, or the like that can detect physical adverse events such as impact or deformation of the vehicle 110d in a vehicle accident (e.g., that might cause injury or death to the customer 101), explosion of the vehicle, or the like. The accelerometer and/or the impact detector can detect such events due to sudden (and sometimes unnatural or unexpected) acceleration/deceleration of the vehicle 110d, given that the customer 101 is assumed to be in vehicle 110d. In some arrangements, the vehicle 110a includes a geolocation system that determines a location of the vehicle 110a, which approximates a location of the customer 101.

In some scenarios, the well-being of the customer 101 is monitored by a sensor 110e. The sensor 110e is installed in a location (e.g., home, office, hospital, or the like) visited or occupied by the customer 101. The sensor 110e includes various devices such as, but not limited to, cameras, microphones, motion sensors, infrared sensors, or the like. The sensor 110e can determine that an adverse event such a crime (e.g., assault, burglary, battery, robbery, murder, or the like) being committed on the customer 101. In other arrangements, the sensor 110e can determine that the customer 101 has collapsed or is associated with a diminishing heat signature, which indicates bleeding or dying. The sensor 110e can determine such adverse events automatically or based on user input of a safety/healthcare personnel monitoring output from the sensor 110e.

One or more of the user devices 110a-110e is connected to a financial institution 140 (e.g., a financial institution computing system 242 of FIG. 2) via a communication network 120. The communication network 120 is any suitable Local Area Network (LAN) or Wide Area Network (WAN). For example, the communication network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The communication network 120 is structured to permit the exchange of data, values, instructions, messages, and the like among one or more of the user devices 110a-110e, the financial institution 140 (e.g., a financial institution computing system 242 of FIG. 2), and a designee device 130 associated with a designee 105.

The designee 105 is a person or entity that is authorized to completely or partially access one or more financial accounts of the customer 101. For instance, the designee 105 is a family member, friend, attorney, trustee, financial service provider, the financial institution 140 itself, or the like. The designee 105 can be selected by the customer 101, the financial institution 140, or another suitable device or entity in the manner described herein. In some arrangements, the designee 105 requires pre-authorization from the customer 101 to serve in the manner described herein with respect to the customer's accounts. The designee device 130 is any computing device (e.g., a mobile device, desktop, tablet, or the like) that can send and receive data via the communication network 120. In some arrangements, the designee device 130 receives authorization messages from the financial institution 140 (e.g., the financial institution computing system 242 of FIG. 2) indicating that access to the account is being authorized in response to incapacitation or death of the customer 101. In some arrangements, the designee device 130 is capable of displaying authorization messages via a display interface and/or accepts user input (e.g., authentication information) of the designee 105 via an input interface.

Figure 2:
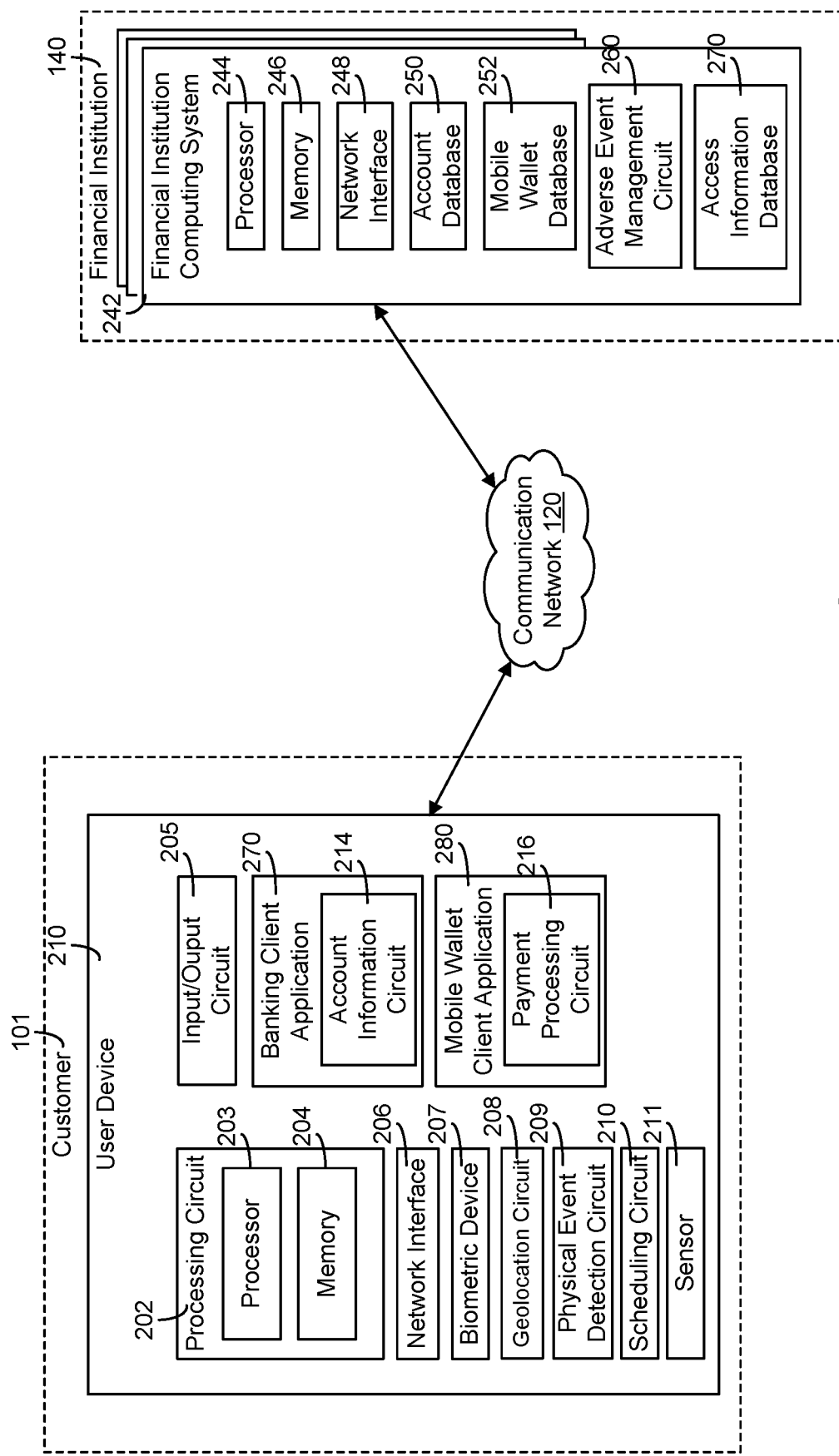
FIG. 2 is a diagram of a user device and a financial institution in the system set forth in FIG. 1 according to some arrangements.

FIG. 2 is a diagram of an example of the user device 210 and an example of the financial institution 140 in the system 100 set forth in FIG. 1 according to some arrangements. Referring now to FIGS. 1-2, the financial institution 140 includes one or more of a bank branch, loan office, mortgage office, financial services office, retail office, Automatic Teller Machine (ATM) location, a combination thereof, and/or the like. The financial institution 140 has at least one associated financial institution computing system 242.

The financial institution 140 provides financial products and services such as, but not limited to, credit card accounts, checking/saving accounts, retirement accounts, mortgage accounts, loan accounts, investment and financial accounts, and the like to the customer 101 via the financial institution computing system 242. The financial institution computing system 242 includes a processor 244 and a memory device 246. The processor 244 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 246 (e.g., Random Access Memory (RAM), Read-Only Memory (ROM), Non-volatile RAM (NVRAM), Flash Memory, hard disk storage, etc.) stores data and/or computer code for facilitating at least some of the various processes described herein. The memory 246 is or includes tangible, non-transient volatile memory or non-volatile memory. In this regard, the memory 246 stores programming logic that, when executed by the processor 244, controls the operations of the financial institution computing system 242.

As shown, the financial institution computing system 242 includes a network interface 248. The network interface 248 is structured for sending and receiving of data over the communication network 120 (e.g., to and from the user device 210, etc.). Accordingly, the network interface 248 includes any of a cellular transceiver (for cellular standards), local wireless network transceiver (for 802.11X, ZigBee, Bluetooth, Wi-Fi, or the like), wired network interface, combination thereof (e.g., both a cellular transceiver and a Bluetooth transceiver), and/or the like.

The financial institution computing system 242 includes an account database 250 that stores customer information and account information relating to one or more accounts held by the customer 101 with the financial institution 140. In this regard, more than one financial institution (such as, but not limited to, the financial institution 140) with an associated financial institution computing system (such as, but not limited to, the financial institution computing system 242) can be communicably coupled to the components of FIG. 2 over the communication network 120 to access the accounts held by the customer 101. The financial institution computing system 242 includes a mobile wallets account database 252 for storing mobile wallet accounts of users, including the customer 101. The mobile wallet accounts permit payments via a mobile wallet client application 280 of the user device 210.

The financial institution computing system 242 includes an adverse event management circuit 260. The adverse event management circuit 260 is operatively coupled to one or more of the components of the financial institution computing system 242. The adverse event management circuit 260 is capable of determining that an adverse event has occurred with respect to the customer 101 and determining access (e.g., granting of access to the designee 105) of one or more financial accounts of the customer 101. For example, the adverse event management circuit 260 is coupled to the network interface 248 for communicating with the user device 210 via the communication network 120. The adverse event management circuit 260 is coupled to one or more of the account database 250 or mobile wallet database 252 to access information stored thereon with respect to the customer 101. In some examples, the adverse event management circuit 260 is implemented with the processor 244. For example, the adverse event management circuit 260 is implemented as a software application stored within the memory 246 and executed by the processor 244. Accordingly, such examples can be implemented with minimal or no additional hardware costs. However, other implementations rely on dedicated hardware specifically configured for performing operations of the adverse event management circuit 260.

In some arrangements, the financial institution computing system 242 includes an access information database 270. The access information database 270 is capable of storing access information such as, but not limited to, types of adverse events to trigger access, designee information (including designee identity and contact information), levels or nature of access, time and/or duration of access, additional authentication information, or the like. As described herein, based on the information stored in the access information database 270, appropriate access is determined. In some arrangements, the access information database 270 is implemented as a part of the memory 246. In other arrangements, the access information database 270 is a separate memory device or database.

As shown, the customer 101 operates or is associated with the user device 210. The user devices 110a-110e are generalized as the user device 210. In other words, the user device 210 can be any of the user devices 110a-110e or any combinations thereof. Each of the user devices 110a-110e includes one or more components shown with respect to the user device 210. Particularly, each of the user devices 110a-110e includes one or more of the detection devices 207-211 capable of determining the adverse event or parameters associated thereof. In some examples, the user device 210 itself includes networking (e.g., a network interface 206), processing (e.g., a processor 203), storage (e.g., memory 204), interface (e.g., input/output circuit 205), and/or financial services capabilities (e.g., banking client application 270, mobile wallet client application 280), or the like. In other examples, the user device 210 is coupled to another device (e.g., a computing device) via a suitable wired or wireless network for one or more of the networking, processing, storage, interface, or financial services capabilities. The user device 210 and the financial institution computing system 242 are communicably and operatively coupled to each other over the communication network 120.

In some arrangements, the user device 210 includes a processing circuit 202 having a processor 203 and memory 204. The processor 203 is implemented as a general-purpose processor, an ASIC, one or more FPGAs, a DSP, a group of processing components that are distributed over various geographic locations or housed in a single location or device, or other suitable electronic processing components. The memory 204 (e.g., RAM, NVRAM, ROM, Flash Memory, hard disk storage, etc.) stores data and/or computer code for facilitating the various processes described herein. Moreover, the memory 204 is or includes tangible, non-transient volatile memory or non-volatile memory. Accordingly, the memory 204 includes database components, object code components, script components, or any other type of information structure for supporting the various activities and information structures described herein.

The user device 210 is shown to include various circuits and logic for implementing the activities described herein. More particularly, the user device 210 includes one or more of a processing circuit 202, input/output circuit 205, network interface 206, biometric device 207, geolocation circuit 208, physical event detection circuit 209, scheduling circuit 210, sensor 211, mobile wallet client application 280, banking client application 270, or the like. While various circuits, interfaces, and logic with particular functionality are shown, it should be understood that the user device 210 includes any number of circuits, interfaces, and logic for facilitating the functions described herein. For example, the activities of multiple circuits are combined as a single circuit and implemented on a same processing circuit (e.g., the processing circuit 202), as additional circuits with additional functionality are included, etc.

The network interface 206 is configured for and structured to establish a communication session via the communication network 120 with the financial computing system 242. Accordingly, the network interface 206 is an interface such as, but not limited to, the network interface 248. In some examples, a network provider can determine that the user device 210 is Out-Of-Service (OOS) when the network interface 206 fails to camp on a suitable cell. In response to the network provider sending a message to the financial institution computing system 242 indicating that the user device 210 has been OOS for over a predetermined period of time (e.g., 1 day, 1 week, 1 month, or the like), the adverse event is detected by the processor 244.

The input/output circuit 205 is configured to receive user input from and provide information to the customer 101. In this regard, the input/output circuit 205 is structured to exchange data, communications, instructions, etc. with an input/output component of the user device 210. Accordingly, in some arrangements, the input/output circuit 205 includes an input/output device such as a display device, touchscreen, keyboard, microphone, and/or the like. In some arrangements, the input/output circuit 205 includes communication circuitry for facilitating the exchange of data, values, messages, and the like between the input/output device and the components of the user device 210. In some arrangements, the input/output circuit 205 includes machine-readable media for facilitating the exchange of information between the input/output device and the components of the user device 210. In still another arrangement, the input/output circuit 205 includes any combination of hardware components (e.g., a touchscreen), communication circuitry, and machine-readable media.

One or more of the banking client application 270 or mobile wallet client application 280 are server-based applications executable on the user device 210. In this regard, the customer 101 has to first download the application(s) prior to usage. In another arrangement, the banking client application 270 and/or mobile wallet client application 280 are coded into the memory 204 of the user device 210. In still another arrangement, the banking client application 270 and/or mobile wallet client application 280 are web-based interface applications. In this configuration, the customer 101 has to log onto or access the web-based interface before usage. In this regard, at least one of the banking client application 270 and mobile wallet client application 280 is supported by a separate computing system comprising one or more servers, processors, network interface modules, etc. that transmit the applications for use to the user device 210. In certain arrangements, one or more of the banking client application 270 and/or mobile wallet client application 280 include an Application Programming Interface (API) and/or a Software Development Kit (SDK) that facilitate integration of other applications. All such variations and combinations are intended to fall within the spirit and scope of the present disclosure.

The banking client application 270 is communicably coupled to the financial institution computing system 242 (e.g., the account database 250) via the network 202 and is structured to permit management of at least one account of the customer 101 via the banking client application 270. In this regard, the banking client application 270 provides displays indicative of account information such as, but not limited to, current account balances, pending transactions, profile information (e.g., contact information), reward associated with the account, bill pay information and/or the like. Further, in some arrangements, the banking client application 270 is configured to process payments from the customer 101 to a designated recipient. For example, the banking client application 270 depicts a loan (e.g., mortgage) of the customer 101 and allows the customer 101 to pay the loan from an account (e.g., checking or savings). In some examples, a bill pay option is provided by the banking client application 270, where the bill pay option allows the customer 101 to pay his/her bills in response to user input.

As mentioned herein, via the banking client application 270, the customer 101 pays bills (e.g., mortgage, etc.), view balances, and otherwise manage their account. Accordingly and as shown, the mobile bank client application 270 includes an account information circuit 214. The account information circuit 214 is linked or otherwise coupled to one or more accounts (as stored the account database 250) held by the customer 101 and permit management of the associated accounts (e.g., transfer balances between accounts, see payment history, etc.) by communicating with the financial institution computing system 242. The banking client application 270 is communicably coupled to the mobile wallet client application 280. As such, in response to a mobile payment via the mobile wallet client application 280, the mobile wallet client application 280 causes the banking client application 270 to update the payment account (i.e., the account that supported the mobile payment). As such, the applications 270 and 280 are communicably coupled to each other to enable actions supported by each respective application in some examples.

The mobile wallet client application 280 is communicably coupled to the financial institution computing system 242 (e.g., the mobile wallets database 252) via the communication network 120 and is structured to facilitate purchases by the customer 101 via the mobile wallet client application 280. Accordingly, the mobile wallet client application 280 is linked or otherwise connected with one or more accounts (as stored the account database 250) of the customer 101. In operation, when at a point-of-sale terminal, the customer 101 initiates the mobile wallet client application 280 and provides a passcode (e.g., biometrics such as a thumbprint, a Personal Identification Number (PIN), a password, etc.) to authenticate the customer 101 and select the source payment account desired (e.g., a checking account from a particular financial institution that is linked to the mobile wallet client application 280). Via communication with the payment terminal (e.g., via near field communication), the aforementioned payment information is provided to the point-of-sale terminal or the merchant (e.g., via NFC, via barcode presentment, etc.) and the payment processed. Beneficially, carrying payment cards are avoided or reduced via the mobile wallet client application 280.

As mentioned herein, the mobile wallet client application 280 is structured to facilitate and permit payments by interfacing with an account held by the customer 101 at the financial institution 140. Accordingly, the mobile wallet client application 280 is communicably coupled via the network interface 206 over the communication network 120 to the financial institution computing system 242. As shown, the mobile wallet client application 280 includes a payment processing circuit 216 structured to facilitate payments by the customer 101 via the mobile wallet client application 280. For example, the payment processing circuit 216 enables a quick-pay capability with a merchant. In this regard, the payment processing circuit 216 includes or be communicably coupled with a communication device (e.g., a near-field communication chip) that facilitates the exchange of information between the mobile wallet client application 280 and a point-of-sale terminal.

In some examples, transactions using the banking client application 270 and/or the mobile wallet client application 280 can be used to determine an adverse event. For instance, in response to determining using the banking client application 270 and/or the mobile wallet client application 280 to pay for a procedure at a hospital for the customer 101, the processor 203 determines that an adverse event has occurred. In another example, in response to the geolocation circuit 208 determines that a transaction using the banking client application 270 and/or the mobile wallet client application 280 has occurred when the user device 210 is determined to be located in a hospital, the processor 203 determines that an adverse event has occurred. In yet another example, in response to determining that the customer 101 has not used the banking client application 270 and/or the mobile wallet client application 280 to pay for any ad hoc transactions within a predetermined period of time (e.g., 2 days, 1 week, 2 weeks, or the like), the processor 203 determines that an adverse event has occurred.

In some arrangements, the user device 210 includes the biometric device 207. The biometric device 207 includes a biometric sensor that determines biometric parameters (e.g., heartrate, blood pressure, blood oxygen level, temperature, brain activities, or the like) of the customer 101. Examples of the biometric sensor include, but not limited to, a heartrate monitor, pacemaker, blood oximeter, thermometer, catheter, electroencephalography, or the like. The biometric device 207 is included in at least the wearable device 110b, the implantable device 110c, or another suitable user device.

In some arrangements, the user device 210 includes the geolocation circuit 208. The geolocation circuit 208 includes hardware and/or software for determining a location of the user device 210, and therefore the location of the customer 101 by inference. The geolocation circuit 208 includes one or more of a GPS radio for satellite positioning, Wi-Fi radio for Wi-Fi positioning, cellular radio for cell tower triangular, combinations thereof, or the like. Therefore, the geolocation circuit 208 can be implemented with or is operatively coupled to the network interface 206. The processing circuit 202 facilitates processing of the geolocation of the user device 210. The geolocation circuit 208 is included in any type of the user devices 110a-110e. Illustrating with a non-limiting example, in response to determining that the user device 210 is in a location affected by a natural disaster, war, or terror attacks, an adverse event is determined to have occurred.

In some arrangements, the user device 210 includes the physical event detection circuit 209. The physical event detection circuit 209 includes one or more accelerometers, impact sensors, or the like that is capable of detecting physical trauma to the customer 101. For instance, the physical event detection circuit 209 includes one or more accelerometers that are provided in any type of the user devices 110a-110e to detect acceleration/deceleration. In some examples, the physical event detection circuit 209 includes one or more impact sensors that are provided in the vehicle 110d to detect impact.

In some arrangements, the user device 210 includes the scheduling circuit 210 that generates, maintains, modifies, or otherwise manages a schedule of the customer 101. The schedule includes meetings, appointments, tickets, travels, or the like. The scheduling circuit 210 can generate the schedule of the customer 101 based on user input via the input/output circuit 205 or by scanning an email to text message client of the customer 101. The scheduling circuit 210 is implemented with the processing circuit 202 and the input/output circuit 205 in some arrangements. In other arrangements, the scheduling circuit 210 is implemented with one or more dedicated processor, memory, or input/output device separate from the processing circuit 202 and the input/output circuit 205. The scheduling circuit 210 can determine failure to meet one or more scheduled appointments and determine that the customer 101 is incapacitated or deceased based on such failure. Illustrating with a non-limiting example, the scheduling circuit 210 stores a schedule that indicates that customer 101 is to return from a trip at a given time by a given flight. Based on the geolocation data determined by the geolocation circuit 208, the processor 203 determines that the customer 101 is not at the airport at the given time and did not board the given flight. In response to such, an adverse event may have occurred.

In some arrangements, the user device 210 includes at least one sensor 211. The sensor 211 is capable of detecting that the customer 101 is incapacitated or deceased based on image recognition, sound recognition, heat signature, or the like. Accordingly, examples of the sensor 211 include, but not limited to, cameras, microphones, motion sensors, infrared sensors, or the like.

Figure 3:
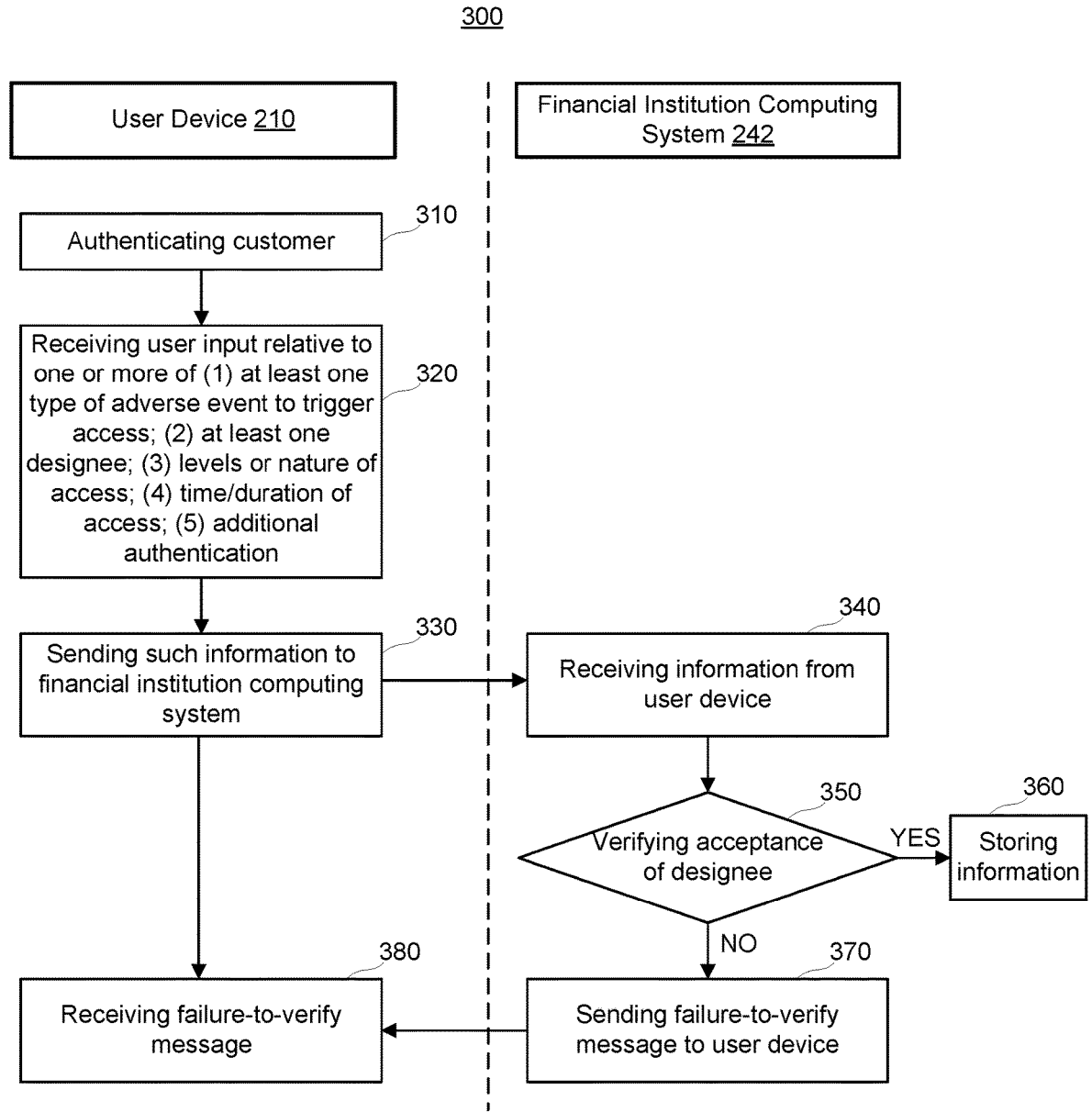
FIG. 3 is a flow diagram illustrating a method for setting up access determination features according to various arrangements.

FIG. 3 is a flow diagram illustrating a method 300 for setting up access determination features according to various arrangements. Referring to FIGS. 1-3, the method 300 is generally concerned with the user device 210 (e.g., the mobile communication device 110a) accepting user input from the customer 101 relative to a manner in which access to one or more financial accounts of the customer 101 is granted. Such information is conveyed to the financial institution computing system 242, where the information is stored for later use.

At 310, the user device 210 authenticates the customer 101. For instance, the customer 101 can input authentication credentials (e.g., username, password, biometric information, or the like) via the input/output circuit 205. Once the authentication credentials are accepted, the customer 101 is authenticated. At 320, the user device 210 receives, via the input/output circuit 205, user input relative to one or more of (1) at least one type of potential adverse events to trigger access; (2) at least one potential designee including the designee 105; (3) potential levels or nature of access; (4) potential time or duration of access; or (5) potential additional authentication. That is, at 320, the customer 101 specifies a manner in which access is granted.

For instance, the customer 101 can specify types of future adverse events for which the access can be granted. The types of adverse events include, but not limited to, incapacitation, death, causes of the adverse event (e.g., crimes, accidents, health issues, or the like), degrees of the incapacitation (e.g., mental incapacitation, physical incapacitation, incapacitation with a high/low likelihood of recovery, or the like), likelihood of the adverse event (e.g., high/low likelihood of death or incapacitation), or the like. In some arrangements, different types of adverse events correspond to one or more different designees, different levels or nature of access, different time or duration of access, or different additional authentication in the manner described.

The customer 101 can specify at least one designee 105 by inputting identification information (e.g., name, identification number, or the like) and/or contact information (e.g., address, phone number, email address, or the like) of the designee 105. In some examples, two or more different designees 105 are specified for joint access. In some examples, the different designees 105 have alternative access to the financial account based on different types of adverse events.

The customer 101 can specify levels or nature of the access by the selected designee 105. The levels or nature of the access refers to one or more of particular accounts (e.g., checking account ending with "1234"), access limit (e.g., no more than $10,000), purpose (e.g., for medical expenses only, emergency fund only, cannot dispose real property, cannot dispose personal properties, or the like), or the like. Various access rules and limitations can be combined. For example, the customer 101 can specify that the designee 105 can access the checking account ending with "1234" with a limit of no more than $10,000 being withdrawn for the purposes of funeral expenses in the case of death of the customer 101. In some examples, different levels or nature of access can be determined based on different types of adverse events.

The customer 101 can specify the time or duration of access. Examples of the time of access include immediately in response to determination of the adverse event, after additional authentication of the designee 105, after a predetermined period (e.g., 24 hours) after determining the adverse event, or the like. Examples of the duration of access include before recovery of the customer 101, a predetermined period after the occurrence of the adverse event, perpetual, or the like. In some examples, different time or duration of access corresponds to different types of adverse events.

The customer 101 can specify whether additional authentication is needed to authenticate the designee 105, or what type of additional authentication is needed for the designee 105. Examples of additional authentication include additional passcodes, biometric authentication, or the like. In some examples, different additional authentication mechanisms correspond to different types of adverse events.

At 330, the user device 210 (e.g., the network interface 206) sends the information received at 320 to the financial institution computing system 242 via the communication network 120. At 340, the financial institution computing system 242 receives the information from the user device 210. At 350, the financial institution computing system 242 verifies acceptance of the designee 250 in some arrangements. For instance, the financial institution computing system 242 sends a verification message to the designee device 130 indicating that the customer 101 has selected the designee 105 to potentially manage at least one financial account of the customer 101 and requests acceptance of the designee 105. The designee 105 can indicate acceptance or rejection via an input device of the designee device 130, which then transmits the response message (e.g., acceptance or rejection) to the financial institution computing system 242 via the communication network 120.

In response to verifying the acceptance of the designee 105 (350:YES), the financial institution computing system 242 stores the information in the access information database 270, at 360. On the other hand, in response to failing to verify the acceptance of the designee 105 (350:NO), the financial institution computing system 242 sends, via the network interface 248, a failure-to-verify message to the user device 210 at 370. The user device 210 receives the failure-to-verify message at 380.

FIG. 4 is a table 400 illustrating correspondence between various types of adverse event with various designees, access levels, access durations, and additional authentications in some arrangements. Referring to FIGS. 1-4, the table 400 illustrates a non-limiting example of the information obtained from the customer 101 at 320 and stored at 360. The table 400 is used to automatically determine the designee 105, access level, access duration, and additional authentication in response to determining that an adverse event of a particular type has occurred. The table 400 is stored in the access information database 270.

For instance, in response to determining that the customer 101 is incapacitated with a high likelihood of recovery, Agent A is automatically selected to be the designee 105. Agent A's access level is for medical expenses only. Agent A can access at least one financial account of the customer 101 before the customer 101 recovers. Agent A is required to enter an additional passcode (e.g., a secret passcode known by the customer 101 and Agent A and specified by the customer 101).

In another example, in response to determining that the customer 101 is incapacitated with a low likelihood of recovery, Family Member A is automatically selected to be the designee 105. Family Member A's access level is for emergency fund only. Family Member A can access at least one financial account of the customer 101 for three months after the occurrence of the adverse event. Family Member A is required to enter a biometric authentication (e.g., finger print authentication specified by the customer 101).

In yet another example, in response to determining that the customer 101 is deceased, a Trustee is automatically selected to be the designee 105. Trustee's access level is limited to specific saving accounts perpetually. No additional authentication is needed for Trustee.

FIG. 5 is a flow diagram illustrating a method 500 for determining access to a financial account held by a customer (e.g., the customer 101 of FIGS. 1 and 2) of a financial institution (e.g., the financial institution 140 of FIGS. 1 and 2) according to various arrangements. Referring to FIGS. 1-5, the method 500 is performed by the financial institution computing system 242 receiving an adverse event message from at least one of the user devices 110a-110e (the user device 210) indicating that an adverse event has occurred with respect to the customer 101. The financial institution computing system 242 then automatically grants access to at least one financial account held by the customer 101 as a response.

For instance, at 510, the financial institution computing system 242 (e.g., the processor 244 and/or the adverse event management circuit 260) determines an adverse event that causes death or incapacitation to the customer 101 based on an adverse event message received from the user device 210 associated with customer 101. In some arrangements, the adverse event message includes an indication that an adverse event has occurred. In other arrangements, the adverse event message includes data (e.g., sensor outputs) relevant to determining whether the adverse event has occurred. In such arrangements, the financial institution computing system 242 determines whether the adverse event has occurred based on the data.

At 520, the financial institution computing system 242 e.g., the processor 244 and/or the adverse event management circuit 260) grants access to the financial account held by the customer 101 to the designee 105 in response to determining the adverse event. In some examples, in response to determining that any adverse event has occurred, the processor 244 and/or the adverse event management circuit 260 automatically grants access to the designee 105. In some examples, different types of adverse events correspond to different designees, levels or nature of access, time or duration of access, additional authentication, or the like.

Figure 6:
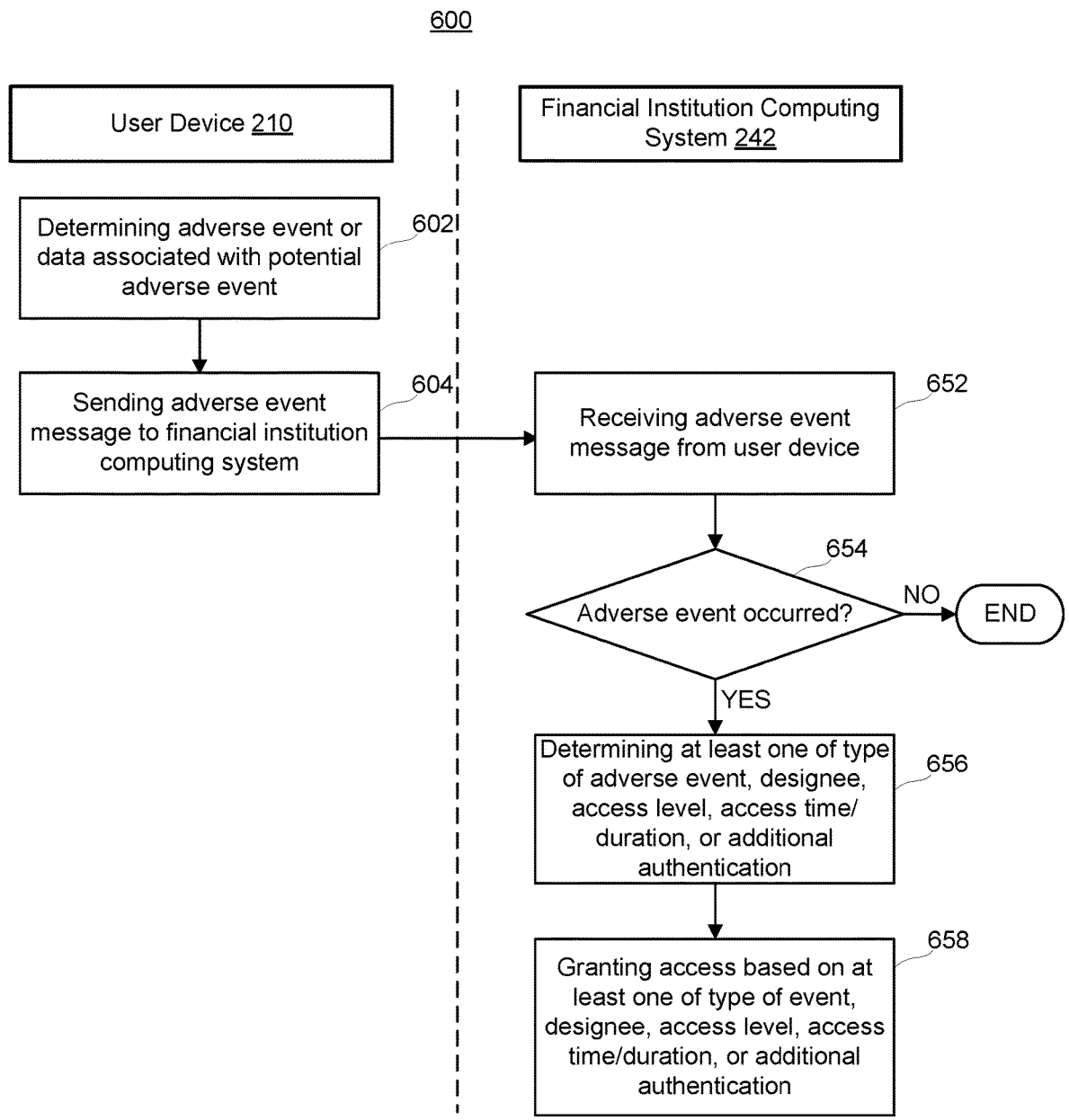
FIG. 6 is a flow diagram illustrating a method for determining access to a financial account held by a customer of a financial institution according to various arrangements.

FIG. 6 is a flow diagram illustrating a method 600 for determining access to a financial account held by a customer (e.g., the customer 101 of FIG. 1) of a financial institution (e.g., the financial institution 140 of FIGS. 1 and 2) according to various arrangements. Referring to FIGS. 1-6, the method 600 is an example of a particular implementation of the method 500 in some arrangements. Thus, one or more of 652-658 corresponds to each of 510 and 520. The method 600 is performed by at least the user device 210 and the financial institution computing system 242 according to various arrangements.

At 602, the user device 210 determines an adverse event or data associated with a potential adverse event with respect to the customer 101. As described the user device 210 (e.g., the user devices 110a-110e) includes one or more components (e.g., the components 207-211) capable of detecting parameters relevant to the well-being of the customer 101. In some arrangements, the user device 210 can determine the adverse event based on the detected parameters. Illustrating with a non-limiting example, in response to the biometric device 207 (e.g., a heartrate monitory) determining that the heartbeat of the customer 101 has stopped, the user device 210 determines that the customer 101 is deceased. In other arrangements, the user device 210 obtains output data using the components 207-211 and sends such output to the financial institution computing system 242 continuously or periodically (e.g., at 604), such that the financial institution computing system 242 can determine the adverse event. Illustrating with a non-limiting example, the user device 210 continuously or periodically sends monitored heartrate data obtained from the biometric device 207 to the financial institution computing system 242, and the processor 244 and/or the adverse event management circuit 260 determines that the customer 101 is deceased in response to determining that the received heartrate reaches zero.

At 604, the user device 210 sends the adverse event message to the financial institution computing system 242 via the communication network 120. Suitable authentication and In some examples, the adverse event message includes an indication that an adverse event has occurred. In such examples, the adverse event message includes identification information that identifies the customer 101 (e.g., by account number, by customer username, contact information, etc.), a tag/indicator that represents occurrence of the adverse event, and the like. In some examples, the adverse event message includes an indication defining the type of adverse events occurred. In such examples, the adverse event message includes identification information that identifies the customer 101, the type of event that occurred (e.g., a fatal or non-fatal heart attack), and the like. In some examples, the adverse event message includes data relevant to a potential adverse event so that the financial institution computing system 242 can determine the adverse event, if any. Such data include sensor output data being transmitted continuously or periodically by the user device 210 to the financial institution computing system 242.

At 652, the financial institution computing system 242 (e.g., the network interface 248) receives the adverse event message from the user device 210. In some examples, suitable authentication/security schemes are used to authenticate the user device 210. At 654, the financial institution computing system 242 (e.g., the processor 244 and/or the adverse event management circuit 260) determines whether an adverse event has occurred. In the arrangements in which the adverse event message includes the indication that the adverse event has occurred, the processor 244 and/or the adverse event management circuit 260 decodes the adverse event message and can determine that the adverse event has occurred (654:YES). In the arrangements in which the adverse event message includes the output data, the processor 244 and/or the adverse event management circuit 260 determines, based on the output data, whether the adverse event has occurred.

In response to determining that no adverse event has occurred (654:NO), the method 600 ends. For instance, in the arrangements in which the adverse event message includes the output data, the processor 244 and/or the adverse event management circuit 260 monitors the continuous or periodic data to determine whether the adverse event message has occurred. For example, in response to determining that continuous heartbeat data received in the adverse event message indicates that the customer 101 is well, no adverse event has occurred. In some arrangements in which the user device 210 fails to authenticate after the financial institution computing system 242 receives an adverse event message from the user device 210, no adverse event has occurred. The financial institution computing system 242 can send a confirmation or alert to the user device 210. On the other hand, in response to determining that the adverse event has occurred (654:YES), the processor 244 and/or the adverse event management circuit 260 determines at least one of the type of adverse event, designee, access level, access time, or additional authentication at 656. In the arrangements in which the adverse event message includes the type of adverse event, the processor 244 and/or the adverse event management circuit 260 determines the type of adverse event by decoding the adverse event message.

In the arrangements in which the adverse event message includes output data without specifying the type of adverse event or that the adverse event has occurred, the processor 244 and/or the adverse event management circuit 260 determines the type of adverse event based on the output data. For instance, in response to determining that the heartrate of the customer 101 reaches zero, the processor 244 determines the type of adverse event to be death. In another example, in response to determining that the vehicle 110d is stationary in a non-congested freeway for more than 20 minutes, the processor 244 and/or the adverse event management circuit 260 determines the type of adverse event to be accident. In yet another example, in response to determining that the mobile communication device 110a has been in a mental health institution for more than one week, the processor 244 and/or the adverse event management circuit 260 determines the type of adverse event to be mental incapacitation.

The designee 105, access level, access time or duration, or additional authentication can be determined using the type of adverse event in accord with the information stored in the access information database 270. That is, the determined type of adverse event is mapped to one or more of the designee 105, access level, access time or duration, or additional authentication based on the correspondence therebetween. As described, the correspondence can be generated using a lookup table, such as, but not limited to, the table 400.

At 658, the processor 244 and/or the adverse event management circuit 260 grants the access based on the at least one of the type of event, designee 105, access level, access time/duration, or additional authentication. That is, the processor 244 and/or the adverse event management circuit 260 grants the designee 105 authorization to access the financial account of the customer 101 in a manner consistent with the access level, access time/duration, or additional authentication determined at 656. In some examples, the access granted to the designee 105 is complete and is consummate with the access of the customer 101. In other examples, the access granted to the designee 105 is less than the access of the customer 101. As described herein, the levels or nature of the access limit access to one or more of particular accounts, access limit, purpose, or the like.

In some examples, the designee 105 had partial access to the financial account prior to the adverse event, such that the level of access is promoted (e.g., enlarge the levels and nature of access) in response to the adverse event. In such examples, the designee 105 can use a same or different set of credentials for the financial account in response to the adverse event.

In some arrangements, granting the access at 658 includes sending, by the network interface 248, online banking credentials to the designee device 130 in any secured methods, including an email, voice mail, phone call, Short Message Service (SMS) message, or the like. In some examples, the credentials are the credentials of the customer 101. In another example, instead of sending the credentials of the customer 101, the network interface 248 sends credentials different from those of the customer 101 to the designee 105. In an additional example, the network interface 248 sends tokens authorizing access of the financial account of the customer 101 without exposing the credentials of the customer 101.

Alternatively, granting the access at 658 includes sending, by the network interface 248, a message to the designee device 130 indicating that access has been granted to the designee 105. The designee 105 has available a set of credentials obtained prior to the adverse event. Such credentials can be included in a message sent by the network interface 248 to the designee device 130 in response to verification of the designee 105 (at 350). In other examples, such credentials can be sent from the user device 210 to the designee device 130 at any point prior to the adverse event.

While in the non-limiting example of FIG. 6, receiving the adverse event message triggers the granting of access, other examples of triggers include a failure to receive periodic adverse event messages. For instance, the customer 101 uses the input/output circuit 205 to indicate periodically (e.g., hourly, daily, or the like) that the customer 101 is well, and in response to each indication, an adverse event message is sent to the financial institution computing system 242. The financial institution computing system 242 determines that the adverse event has occurred in response to determining that at least one periodic adverse event message has not been received timely.

Figure 7A:
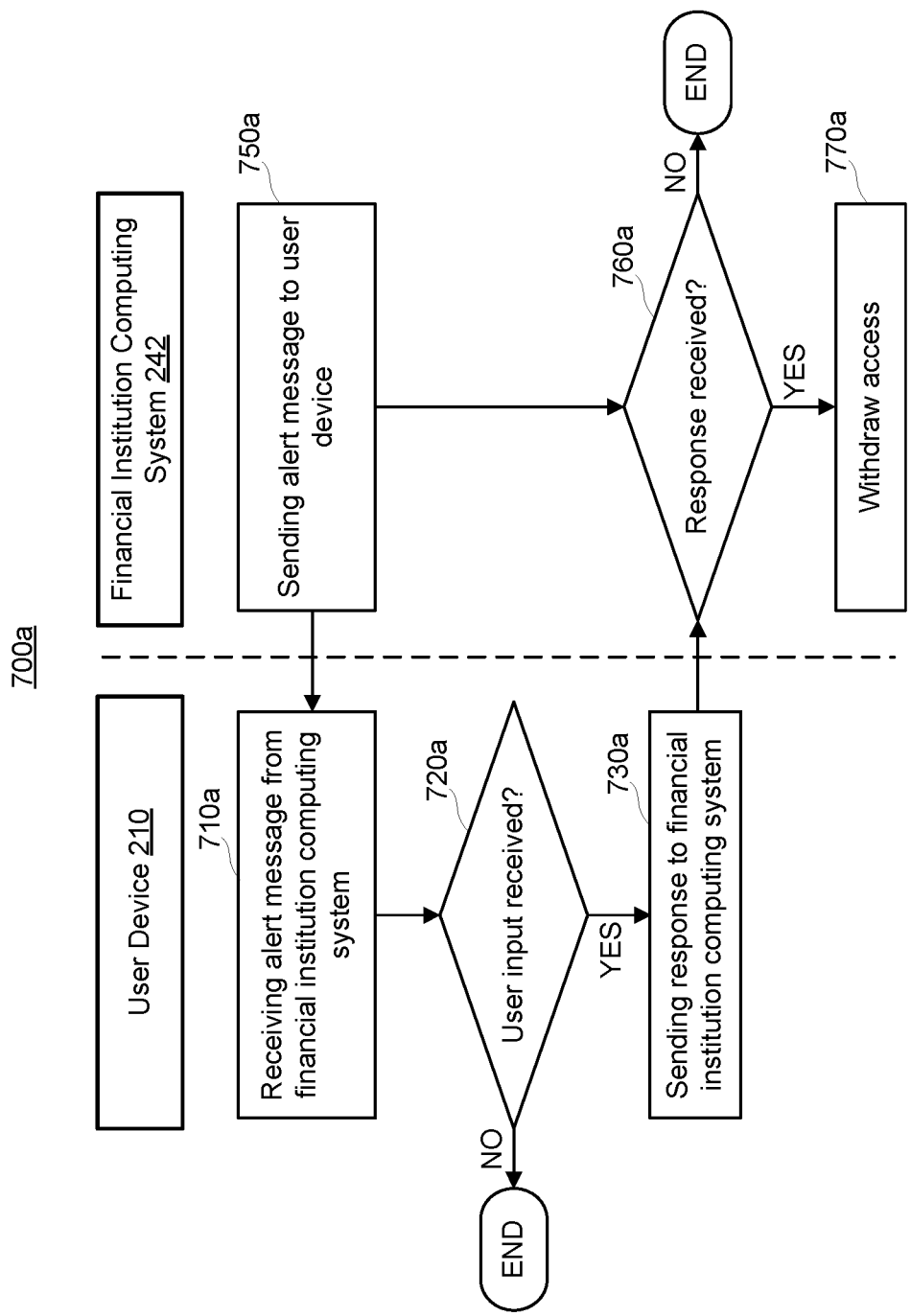
FIG. 7A is a flow diagram illustrating a method for withdrawing access to a financial account held by a customer of a financial institution according to various arrangements.

FIG. 7A is a flow diagram illustrating a method 700a for withdrawing access to a financial account held by a customer (e.g., the customer 101 of FIGS. 1 and 2) of a financial institution (e.g., the financial institution 140 of FIGS. 1 and 2) according to various arrangements. Referring to FIGS. 1-7A, the method 700a is generally concerned with allowing the customer 101 to withdraw access after the access has been granted to the designee 105 at 658. 710a-730a are performed after 604 in some arrangements. 750a-770a are performed in response to 658 in some arrangements.

At 750a, the network interfaced 248 of the financial institution computing system 242 sends an alert message to the user device 210 (e.g., the mobile communication device 110a) via the communication network 120 indicating that access has been granted to the designee 105 in response to 658. The alert message identifies the designee 105 in some arrangements. At 710a, the user device 210 receives the alert message from the financial institution computing system 242.

At 720a, the processor 203 determines whether user input has been received from the customer 101 via the input/output circuit 205. The user input indicates whether the customer 101 wishes to withdraw access. In response to determining that no user input has been received (720a:NO), the method 700a ends for the user device 210, and the access for the designee 105 is continued. On the other hand, in response to determining that user input indicating that access granted is to be withdrawn (720a:YES), the network interface 206 sends the response to the financial institution computing system 242, at 730a.

At 760a, the processor 244 determines whether a response has been received from the user device 210. The network interfaced 248 of the financial institution computing system 242 can receive the response over the communication network 120. In response to determining that no response has been received (760a:NO), the method 700a ends for the financial institution computing system 242, and the access of the designee 105 is continued. On the other hand, in response to determining that a response has been received (760a:YES), the access to the designee 105 is withdrawn at 770a.

Figure 7B:
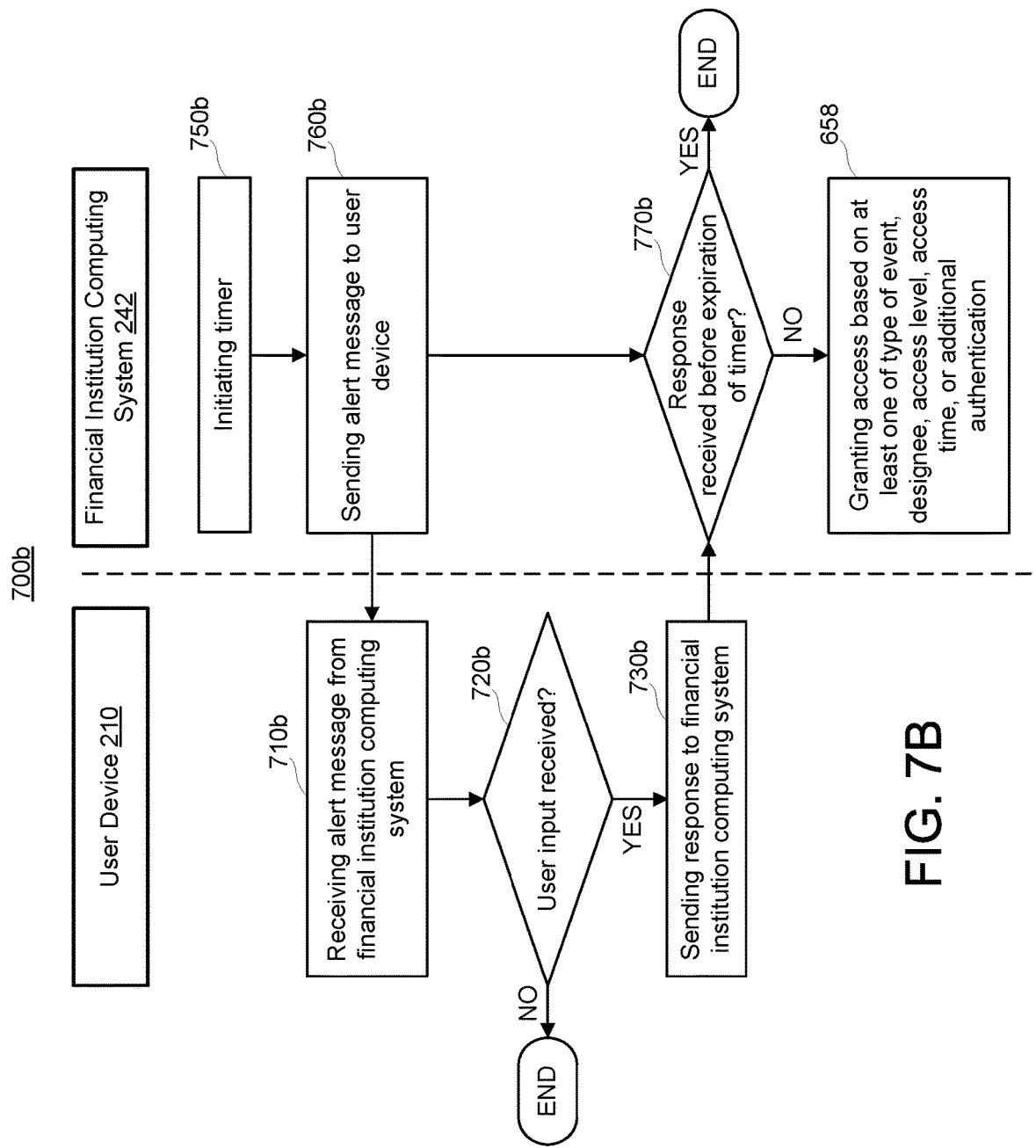
FIG. 7B is a flow diagram illustrating a method for granting access to a financial account held by a customer of a financial institution according to various arrangements.

FIG. 7B is a flow diagram illustrating a method 700b for granting access to a financial account held by a customer (e.g., the customer 101 of FIGS. 1 and 2) of a financial institution (e.g., the financial institution 140 of FIGS. 1 and 2) according to various arrangements. Referring to FIGS. 1-7B, the method 700b is generally concerned with granting access to the designee 105 in response to expiration of a timer that is started when the adverse event is determined, unless the customer 101 specifies otherwise. 710b-730b are performed after 604 in some arrangements. 750b-770b are performed in response to 656 and before 658 in some arrangements.

At 750b, the processor 244 initiates a timer for a predetermined duration (e.g., 5 m, 10 m. 30 m, 1 h, or the like), for instance, in response to 656. At 760b, the network interfaced 248 of the financial institution computing system 242 sends an alert message to the user device 210 (e.g., the mobile communication device 110a) via the communication network 120 indicating that access should be granted to the designee 105, for example, in the manner described with respect to 656. At 710b, the user device 210 receives the alert message from the financial institution computing system 242.

At 720b, the processor 203 determines whether user input has been received from the customer 101 via the input/output circuit 205. The user input indicates whether the customer 101 wishes to deny access. In response to determining that no user input has been received (720b:NO), the method 700b ends for the user device 210, and the access is granted at 658. On the other hand, in response to receiving user input indicating that access is denied by the customer 101 (720b:YES), the network interface 206 sends the response to the financial institution computing system 242, at 730b.

At 770b, the processor 244 determines whether a response has been received from the user device 210. The network interfaced 248 of the financial institution computing system 242 can receive the response over the communication network 120. In response to determining that the response (indicating that the access is not to be granted to the designee 150) has been received before the expiration of the timer (770b:YES), the method 700b ends for the financial institution computing system 242, and no access is to be granted. On the other hand, in response to determining that no response has been received before expiration of the timer (770b:NO), the processor 244 grants the access based on the at least one of the type of event, designee 105, access level, access time/duration, or additional authentication at 658.

In other arrangements, in addition or alternative to granting access (e.g., at 658), other types of activities (e.g., payments) can be authorized or de-authorized. In one example, in response to granting the access to the designee 105 or in response to determining that the adverse event has occurred (e.g., at 654), automatic payments (e.g., automatic mortgage payments) can be set up to allow timely payment of mortgages even when the customer 101 is deceased or incapacitated. In another example, in response to granting the access to the designee 105 who is an agent managing emergency funds for the customer 101, a payment to the agent can be automatically triggered so that the agent is compensated. In some examples, in response to granting the access to the designee 105 or in response to determining that the adverse event has occurred, some or all automatic payments or other payments scheduled for after the adverse event are ceased. In some arrangements, power of attorney is granted to the designee 105 or another person specified by the customer 101 in response to determining that the adverse event has occurred. In some arrangements, a Do-Not-Resuscitate (DNR) order is sent to the designee 105 or another person specified by the customer 101 in response to determining that the adverse event has occurred.

In some examples, instead of receiving the adverse event message from the user device 210, the adverse event message can be triggered by the financial institution computing system 242 or another suitable device of the financial institution 140. For instance, in response to receiving a death notification from an Automated Clearing House (ACH) system (not shown) of the financial institution 140 via the communication network 120, the processor 244 determines that an adverse event of death has occurred with respect to the customer 101. The financial institution computing system 242 can further receive Death Notification Entry (DNE), incarceration notifications, hospitalization notifications, or other public records from sources other than the user device 210, such as, but not limited to, Social Security Administration, hospitals, police stations, jails, or other suitable government agencies or authorized private entities.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for determining an access to a financial account held by a customer of a financial institution, the method comprising:
    establishing, by a processor of a financial institution computing system, a communication session with a sensor device of a user device associated with the customer, wherein the financial institution computing system continuously receives sensor data over the communication session from the sensor device;
    receiving, by the processor from a point-of-sale (POS) terminal, a payment request;
    retrieving, by the processor from the user device via an application programming interface (API), device data comprising at least application data of an application installed on the user device;
    receiving, by the processor from the sensor device, the sensor data comprising at least one of geolocation data or biometric data of the sensor device;
    determining, by the processor, the customer experienced an adverse event based on the sensor data and the device data;
    determining automatically, by the processor, an access level based on information stored in an account database and the adverse event; and
    in response to determining the access level, authorizing, by the processor, the payment request utilizing the financial account held by the customer to a designee, wherein the payment request is authorized based on conforming to the access level.

2. The method of claim 1, wherein authorizing the payment request utilizing the financial account held by the customer to the designee comprises sending credentials associated with the financial account to a designee device associated with the designee.

3. The method of claim 1, further comprising:
    sending, by the processor, an alert message to the sensor device associated with the customer notifying the customer that the access has been granted.

4. The method of claim 3, further comprising:
    receiving, by the processor, a second response from the sensor device to withdraw the access; and
    in response to receiving the second response, withdrawing, by the processor, the access authorized based on modifying the access level, wherein the access level is associated with at least one of a financial account, an access limit, or an access purpose.

5. The method of claim 1, further comprises:
    initiating, by the processor, a timer in response to determining the adverse event; and
    sending, by the processor, an alert message to the sensor device associated with the customer notifying the customer that the payment request is authorized.

6. The method of claim 1, wherein authorizing the access to the financial account to the designee comprises authenticating the designee based on a set of credentials associated with the designee.

7. The method of claim 1, wherein the geolocation data comprises a location of the sensor device and a duration of time at the location, wherein the geolocation data is determined based on one or more of a global positioning system (GPS) radio, a wife positioning system (WPS), or a radio; or a mobile positioning system (MPS) radio.

8. The method of claim 1, further comprising:
    selecting, by the processor, a payment method based on the received payment request and the device data, wherein the user device and the processor are communicably coupled via a communication network.

9. The method of claim 1, wherein the application installed on the user device is at least one of a mobile wallet client application or a banking client application, and wherein the application data include historical payment information associated with the customer.

10. A system comprising:
    at least one processing circuit configured to:
        establish a communication session with a sensor device of a user device associated with a customer, wherein the at least one processing circuit continuously receives sensor data over the communication session from the sensor device;
        receive, from a point-of-sale (POS) terminal, a payment request;
        retrieve, from the user device via an application programming interface (API), device data comprising at least application data of an application installed on the user device;
        receive, from the sensor device, the sensor data comprising at least one of geolocation data or biometric data of the sensor device;
        determine the customer experienced an adverse event based on the sensor data and the device data;
        determine automatically an access level based on information stored in an account database and the adverse event; and
        in response to determining the access level, authorize the payment request utilizing a financial account held by the customer to a designee, wherein the payment request is authorized based on conforming to the access level.

11. The system of claim 10, wherein authorizing the payment request utilizing the financial account held by the customer to the designee comprises sending credentials associated with the financial account to a designee device associated with the designee.

12. The system of claim 10, wherein the at least one processing circuit is further configured to:
send an alert message to the sensor device associated with the customer notifying the customer that access has been granted.

13. The system of claim 12, wherein the at least one processing circuit is further configured to:
receive a second response from the sensor device to withdraw the access; and
in response to receiving the second response, withdraw the access authorized based on modifying the access level, wherein the access level is associated with at least one of a financial account, an access limit, or an access purpose.

14. The system of claim 10, wherein the at least one processing circuit is further configured to:
initiate a timer in response to determining the adverse event; and
send an alert message to the sensor device associated with the customer notifying the customer that the payment request is authorized.

15. The system of claim 10, wherein authorizing an access to the financial account to the designee comprises authenticating the designee based on a set of credentials associated with the designee.

16. The system of claim 10, wherein the geolocation data comprises a location of the sensor device and a duration of time at the location, wherein the geolocation data is determined based on one or more of a global positioning system (GPS) radio, a wifi positioning system (WPS), or a radio; or a mobile positioning system (MPS) radio.

17. The system of claim 10, wherein the at least one processing circuit is further configured to:
select a payment method based on the received payment request and the device data, wherein the user device and the at least one processing circuit are communicably coupled via a communication network.

18. The system of claim 10, wherein the application installed on the user device is at least one of a mobile wallet client application or a banking client application, and wherein the application data include historical payment information associated with the customer.

19. One or more non-transitory computer-readable storage media having instructions stored thereon that, when executed by at least one processing circuit, cause the at least one processing circuit to:
establish a communication session with a sensor device of a user device associated with a customer, wherein the at least one processing circuit continuously receives sensor data over the communication session from the sensor device;
receive, from a point-of-sale (POS) terminal, a payment request;
retrieve, from the user device via an application programming interface (API), device data comprising at least application data of an application installed on the user device;
receive, from the sensor device, the sensor data comprising at least one of geolocation data or biometric data of the sensor device;
determine the customer experienced an adverse event based on the sensor data and the device data;
determine automatically an access level based on information stored in an account database and the adverse event; and
in response to determining the access level, authorize the payment request utilizing a financial account held by the customer to a designee, wherein the payment request is authorized based on conforming to the access level.

20. The one or more non-transitory computer-readable storage media of claim 19, having instructions stored thereon that, when executed by the at least one processing circuit, cause the at least one processing circuit to:
select a payment method based on the received payment request and the device data, wherein the user device and the at least one processing circuit are communicably coupled via a communication network, wherein the application installed on the user device is at least one of a mobile wallet client application or a banking client application, and wherein the application data include historical payment information associated with the customer.

* * * * *